July 29, 1952 F. JOB 2,605,333
FAULT SIGNALING SYSTEM FOR AMPLIFIER CIRCUITS
Filed May 10, 1951
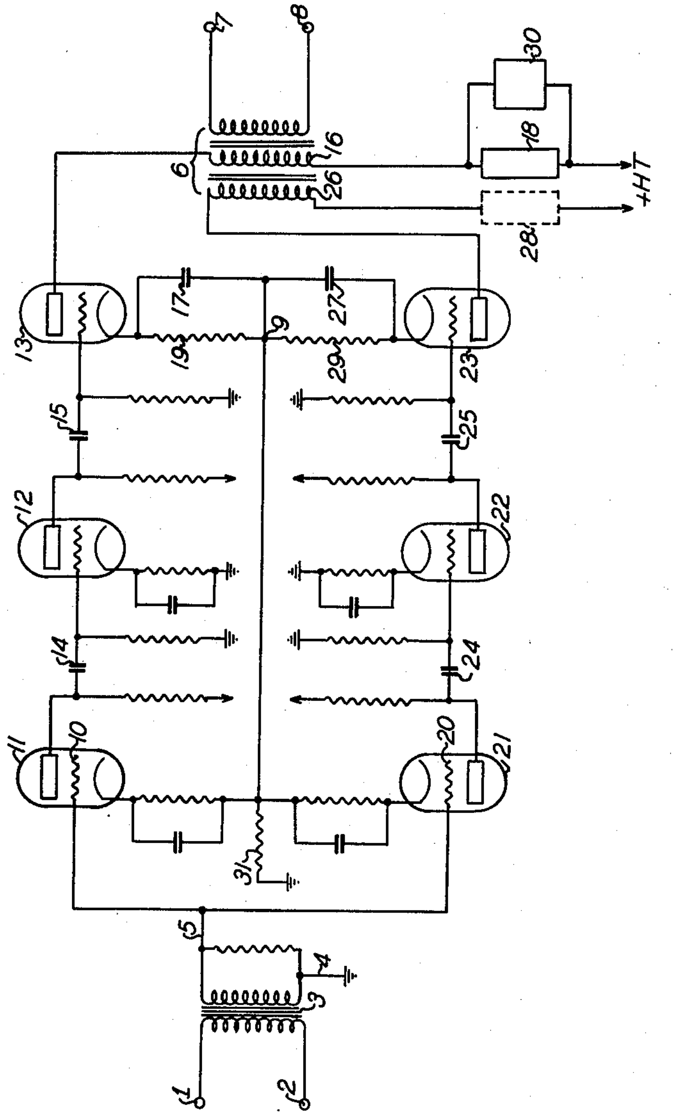
INVENTOR
FRANCOIS JOB
BY Haseltine Lake and Co.,
AGENTS Patented July 29, 1952 2,605,333

UNITED STATES PATENT OFFICE 2,605,333

FAULT SIGNALING SYSTEM FOR AMPLIFIER CIRCUITS

François Job, Paris, France

Application May 10, 1951, Serial No. 225,479
In France May 17, 1950

1 Claim. (Cl. 177—311)

The present invention relates to fault signalling systems for electronic amplifiers. More especially, the invention concerns fault signalling systems in amplifiers having two amplification paths in parallel with a common negative feedback path.

Amplifiers of this type have been proposed for the amplification of very wide band signals, particularly of signals such as are met with in systems with numerous carrier current channels. In such systems, the greater the number of channels to be amplified, the greater should be the operating reliability. In such amplifiers, signalling is effected by means of a pilot current of predetermined frequency which develops in load impedances selective voltages adjusted to said frequency and inserted in the last stage of each amplification path for controlling the correct operation of said amplification paths. The result is that the fault signalling system of such amplifiers operates only when a pilot current is applied to their input and comprises two selective control impedances, one at the output of each amplification path.

One object of the present invention is to provide a fault signalling system for each path of amplification, not requiring the application of a pilot signal at the input to the amplifier.

Another object of the present invention is to provide a fault signalling system for both paths of amplification by means of a single selective impedance at the output from one of the amplification paths.

According to a characteristic feature, the invention consists in utilizing, as signalling currents, the background noise caused by the first stage tubes of each one of the amplification paths. These currents are collected in the output circuit of one of the amplification paths in a selective signalling network having a pass band outside the band occupied by the useful signals, so as to retain only noises whose frequencies are different from those of the useful signals but are contained in a frequency band where the negative feedback rate is sufficiently high.

When the two amplification paths operate normally, these noises are of the same order of magnitude as those which would exist without any negative feedback, while on the contrary, in case of a fault in one amplification path, they are very low. This variation of the signalling currents due to the background noise of the tubes is much more pronounced than if the said currents were due to a pilot signal or to the background noise collected by the line and applied to the input of the amplifier. As will be explained later, the difference between this variation of the signalling current in the two hypotheses is substantially due to the fact that in the case of a pilot signal or of the background noise collected by the line, the input signals of the two amplification paths are in phase (or in phase opposition if the amplifier is a push-pull amplifier, or at least they offer a definite phase relationship) while the background noises of the tubes should be considered as random variables and behave as such.

The invention will be described hereinafter on a particular type of embodiment, with reference to the single appended figure.

Referring to said figure, there are two amplification paths, the first one consisting of the three tubes 11, 12 and 13, the second one of the three tubes 21, 22 and 23. The connection between the amplifier tubes of one path is effected by means of connecting condensers 14, 15, 24, 25 respectively.

The input signals are applied to the terminals 1, 2 of the primary winding of the input transformer 3, common to the two amplification paths, the secondary winding of which has one of its ends 4 connected to ground and the other end 5 simultaneously connected to the grids 10 and 20 of the first tubes 11 and 21 of each amplification path.

The anode circuit of the last tube 13 of the first amplification path comprises a winding 16 of the output transformer 6 and a selective network 18 whose passband is outside the useful signal frequency band. A voltmeter 30 which constitutes the signalling instrument is connected to the terminals of 18. 30 may be an amplifying voltmeter or it may be replaced by a rectifier followed by a signalling electro-mechanical relay.

The anode circuit of the last tube 23 of the second amplification path comprises a second winding 26 of the output transformer 6 and a network 28 similar to 18 shown in dotted lines on the figure and which could be omitted, as will be seen.

The output of useful signals takes place at the terminals 7—8 of the secondary of the transformer 6.

The cathode resistances 19 and 29 of the two tubes 13 and 23 are connected to point 9 and are shunted by the condensers 17 and 27. The common cathode resistance 31 constitutes a negative feedback of the series type at the input of the amplifiers. Each feedback path of the set up is thus of the series type at the input and also of the series type at the output.

From an inspection of the diagram in the appended figure, it will be seen that the system which is an object of the invention comprises two amplifiers in parallel, to the common input of which and through a common resistance 31, there is applied a negative feedback voltage proportional to the sum of the output currents of each one of the two amplification paths.

Due to this negative feedback applied to the sum of the output currents, when a signal is applied to the input common to the two amplifiers, the sum of their output currents is independent of the gain of each amplifier within the limits inside which the negative feedback rate remains sufficiently high.

The same thing does not hold for the output current from each one of the two amplifiers; these currents are in the ratio of the gains of the two amplifiers without any feedback.

It will be assumed in what follows, and by way of example, that the output tubes 13 and 23 are pentodes.

When a signal is applied not to the common terminals 1, 2 of the two amplifers, but inside one of the amplification paths, for instance the path 11, 12, 13, which is the case for noise contributed by tube 11, this signal appears as a current injected by the output tube 13 into a common load impedance which can be supposed to be connected at the output terminals 7, 8 of transformer 6.

Owing to the negative feedback impedance 31, this current is considerably decreased, and even practically cancelled by the sum of the currents appearing in each one of the tubes 13 and 23 and resulting from the amplification of the noise voltage injected into the resistance 31.

When the two amplifiers have the same gain, these two latter currents are equal and, therefore, are individually substantially equal to half the noise current which would exist without any negative feedback. As a net result, the resulting currents in each one of the output circuits of the tubes 13 and 23 are substantially half the noise current which would be present without any negative feedback.

When the amplification path 21, 22, 23 is momentarily not in service, the negative feedback current which practically cancels the initial noise current is supplied only by the tube 13. The corresponding output current from this tube is thus almost zero, equal in fact to the initial noise current divided by the negative feedback rate.

If now the same reasoning is applied to the noise contributed by the second amplification path, it will be seen that this noise is practically added to the first one and does not change the orders of magnitude; on the contary, it amplifies the phenomenon.

The result is that a signalling device may be used, controlled by the noise and inserted in the output circuit of one of the amplification chains, since, in case of a fault, this current will be considerably decreased or will even become zero.

Of course, the system can work, practically, only if the signalling device used is insensitive to signal currents normally transmitted by the amplifiers, i. e. to telephone frequency or carrier frequency currents. This is the purpose of the selective network 18 of the figure, at the terminals of which network the control voltage for the signalling device 39 is obtained. This network should be designed so that there be no appreciable voltage developed at its terminals by effective signal currents.

The above considerations may be illustrated mathematically as follows:

Let $e_1$ be the equivalent noise voltage of the tube 11 referred to the input of the amplifier and $E_1'$, $E_2'$, the corresponding output voltages at the terminals of the impedances 18 and 28.

Let $e_2$ be the equivalent noise voltage of the tube 21 referred to the input of the amplifier and $E_1''$, $E_2''$, the corresponding output voltages at the terminals of the same impedances.

Finally let $\mu_1$ and $\mu_2$ be the gains of the two amplification paths assumed to have no feedback, and $\mu_1\beta_1$ and $\mu_2\beta_2$ the gains on the feedback loops. These latter gains comprise a common part $\beta_1=\beta_2=\beta$ but, for the time being, calculations will be made without this simplification.

There may be written, for the input signal $e_1$:

$$(1)\quad \begin{cases}\mu_1(e_1-E_1'\beta_1-E_2'\beta_2)=E_1'\\ -\mu_2(E_1'\beta_1+E_2'\beta_2)=E_2'\end{cases}$$

and, for the input signal $e_2$, the equations:

$$(2)\quad \begin{cases}-\mu_1(E_1''\beta_1+E_2''\beta_2)=E_1''\\ \mu_2(e_2-E_1''\beta_1-E_2''\beta_2)=E_2''\end{cases}$$

The first one gives the output voltage $E_1'$ due to the noise of the tube 13:

$$E_{1'}=\frac{\mu_1 e_1(1+\mu_2\beta_2)}{1+\mu_1\beta_1+\mu_2\beta_2}$$

The second one gives the output voltage $E_1''$ due to the noise of the tube 23:

$$E_1''=\frac{\mu_2 e_2\times\mu_1\beta_2}{1+\mu_1\beta_1+\mu_2\beta_2}$$

If now account is taken of the fact that $\beta_1=\beta_2=\beta$ and if it is assumed that the two tubes 11 and 21 are of the same type, one may write:

$$e_1=e_2=e$$

Therefrom:

$$(3)\quad \begin{cases}E_1'=\dfrac{\mu_1 e(1+\mu_2\beta)}{1+(\mu_1+\mu_2)\beta}\\[2ex] E_1''=\dfrac{\mu_2 e\times\mu_1\beta}{1+(\mu_1+\mu_2)\beta}\end{cases}$$

The voltage at the terminals of 18 will be $$\epsilon_1=\sqrt{E_1'^2+E_1''^2}$$

or:

$$\epsilon_1=\frac{\mu_1 e}{1+(\mu_1+\mu_2)\beta}\sqrt{1+2\mu_2\beta+2\mu_2^2\beta^2}$$

or:

$$(4)\quad \epsilon_1=\frac{E_1\sqrt{1+2\mu_2\beta+2\mu_2^2\beta^2}}{1+(\mu_1+\mu_2)\beta}$$

where $E_1=\mu_1 e$ is the output signal from the first amplification path assumed to be without any negative feed back.

If the first amplification path fails $\mu_1=0$ $$(5)\quad \epsilon_1=0$$

If the second amplification path fails $\mu_2=0$ $$(6)\quad \epsilon_1=\frac{E_1}{1+\mu_1\beta}$$

If we assume, on normal service, for instance $\mu_1\beta=\mu_2\beta=20$, then:

($\epsilon_1$) normal operation$=0.70E_1$
($\epsilon_1$) first amplification path faulty$=0$
($\epsilon_1$) second amplification path faulty$=0.05E_1$ It will be seen that if the second path becomes faulty, the signalling voltage is divided by about 15. The voltmeter 20 will show a drop which will indicate the lack of amplification of this path. The drop will be more pronounced still and the voltmeter indication will become zero if it is the first path which is faulty.

In order to bring out more clearly the advantages of the invention, there is given, below, what Equations 4, 5, and 6 would become if, instead of taking as a signal the equivalent noise voltage $e_1$ and $e_2$, of the tubes 11 and 21, the line background noise had been taken as a signal. This signal $e$ would then be applied in phase to the grids 10 and 20 of the first tubes, with amplitudes $e_1$ and $e_2$ and Equations 1 and 2 would reduce to:

$$(1') \quad \mu_1[e_1-(E_1)\beta_1-(E_2)\beta_2]=(E_1)$$
$$\mu_2[e_2-(E_1)\beta_1-(E_2)\beta_2]=(E_2)$$

designating by $(E_1)$ and $(E_2)$ the output voltages, hence:

$$(E_1)=\frac{e_1\mu_1(1+\mu_2\beta_2)-e_2\beta_2\mu_1\mu_2}{1+\mu_1\beta_1+\mu_2\beta_2}$$

and, with the same hypotheses as before:

$$\beta_1=\beta_2=\beta$$
$$e_1=e_2=e$$

$$(E_1)=\frac{e\mu_1}{1+(\mu_1+\mu_2)\beta}$$

$$(1') \quad (E_1)=\frac{E_1}{1+(\mu_1+\mu_2)\beta}$$

where $E_1$, as before, is the output signal from the first amplification path assumed to be without any negative feedback.

If the first amplification path becomes faulty $\mu_1=0$ $$(5') \quad (E_1)=0$$

If the second amplification path becomes faulty $\mu_2=0$ $$(6') \quad (E_1)=\frac{E_1}{1+\mu_1\beta}$$

With the same numerical example as before we have:

$(E_1)$ normal operation$=0.025E_1$
$(E_1)$ first amplification path faulty$=0$
$(E_1)$ second amplification path faulty$=0.05E_1$ It will be seen that if the second path becomes faulty, the signalling voltage is now multiplied by 2 and no longer divided by 15.

For instance, if an amplifier according to the invention is used for amplifying a signal occupying a bandwidth between 60 kcs. and 4 mcs., it will be possible to adjust the network 18 on a frequency band whose lower limit is above 4 mcs. The bandwidth of 18 will be determined so as to have an output current sufficient for operating a signalling device, taking into account the fact that such a current, everything else being equal, varies like the square root of the bandwidth. The network 28 may be omitted, if it is not desired to have a signalling offering a double safety, since it was seen above that a single signalling device such as (18, 30) already makes it possible to operate an alarm device.

Although the invention has been described with reference to one type of embodiment, numerous other set ups, different as to the number of tubes in each amplification path and as to the nature of the feedback loop may occur to persons skilled in the art and remain within the general scope of the invention. Possible interactions between the two amplification paths through the transformer 6 are reduced to a minimum if care is taken to use, for 13 and 23, tubes having a high internal impedance or, in any case, if the impedances of the anode circuits of these tubes are high as compared with the impedance of the network 18.

What I claim is:

A system for controlling the operation of an amplifier having two paths of amplification, the inputs of which are in parallel and the outputs of which are coupled to the same working circuit, each path comprising a chain of amplifiers and the two chains of amplification using a common feedback loop, said amplifiers utilizing a fault signalling device operated by the voltage derived at the terminals of a selective impedance or network connected in series in the output circuit of one of the amplification paths, said impedance or network being designed so as to collect or transmit to said signalling device only control voltages having frequencies outside the frequency bands occupied by the currents of carrier frequency telephone signals or other signals to be amplified, characterized in that the fault signalling voltage is provided by the background noise of the amplifier tubes of the input stage to each of the two amplification paths.

FRANÇOIS JOB.

REFERENCES CITED

The following references are of record in the file of this patent:

UNITED STATES PATENTS

| Number | Name | Date |
|---|---|---|
| 2,199,189 | Scheldorf | Apr. 30, 1940 |